(12) United States Patent
Sistach

(10) Patent No.: US 12,053,927 B2
(45) Date of Patent: Aug. 6, 2024

(54) PROCESS FOR MANUFACTURING A PART BY LOCAL IRRADIATION OF A MATERIAL BY AT LEAST TWO CONVERGING BEAMS

(71) Applicant: SAFRAN AIRCRAFT ENGINES, Paris (FR)

(72) Inventor: Hugo Jean-Louis Sistach, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 6 days.

(21) Appl. No.: 17/603,638

(22) PCT Filed: Apr. 3, 2020

(86) PCT No.: PCT/EP2020/059578
§ 371 (c)(1),
(2) Date: Oct. 14, 2021

(87) PCT Pub. No.: WO2020/212171
PCT Pub. Date: Oct. 22, 2020

(65) Prior Publication Data
US 2022/0194005 A1    Jun. 23, 2022

(30) Foreign Application Priority Data

Apr. 16, 2019 (FR) ..................................... 1904035

(51) Int. Cl.
*B29C 64/268* (2017.01)
*B22F 10/28* (2021.01)
(Continued)

(52) U.S. Cl.
CPC ............ *B29C 64/268* (2017.08); *B22F 10/28* (2021.01); *B22F 12/45* (2021.01); *B28B 1/001* (2013.01);
(Continued)

(58) Field of Classification Search
None
See application file for complete search history.

(56) References Cited

U.S. PATENT DOCUMENTS 4,041,476 A * 8/1977 Swainson ............... B01J 19/121
                                                              365/119
5,354,414 A * 10/1994 Feygin ..................... B22F 3/004
                                                              216/84
(Continued)

FOREIGN PATENT DOCUMENTS

DE    102013114003 A1 *  6/2015 ................ B22F 3/02
DE    102013114003 A1     6/2015
(Continued)

OTHER PUBLICATIONS

Guenster, J. et al. "Machine Translation for DE 102013114003 A1: Method for Producing a Three-Dimensionally Structured Object by Sintering and Sintering Method Therefor". EPO. Espacenet. 2023 (Year: 2023).*

(Continued)

*Primary Examiner* — Farah Taufiq
*Assistant Examiner* — Jonathan B Woo
(74) *Attorney, Agent, or Firm* — Pearne & Gordon LLP

(57) ABSTRACT

Manufacturing of a part by local irradiation of a material that can be sintered, melted or photopolymerized, by: providing a volume of the material for manufacturing the part and compressing the volume by applying a pressure; defining, in the volume, a plurality of different target volumes, the combined target volumes defining the part to be manufactured; for each target volume, maintaining the pressure applied to the volume and simultaneously irradiating the target volume with at least two continuous beams that converge in the target volume; releasing the obtained part from the rest of non-irradiated material. The material is partially transparent to the beams; the energy applied to the (Continued)

target volume by each beam is greater than $E_{threshold}$, the sum of the energies applied to the target volume by each of the beams is greater than or equal to $E_{transformation\ threshold}$.

12 Claims, 1 Drawing Sheet

(51) Int. Cl.

| | | |
|---|---|---|
| *B22F 12/45* | (2021.01) | |
| *B28B 1/00* | (2006.01) | |
| *B29C 64/153* | (2017.01) | |
| *B29C 64/282* | (2017.01) | |
| *B33Y 10/00* | (2015.01) | |

(52) U.S. Cl.
CPC .......... *B29C 64/153* (2017.08); *B29C 64/282* (2017.08); *B33Y 10/00* (2014.12)

(56) References Cited

U.S. PATENT DOCUMENTS

| | | | |
|---|---|---|---|
| 6,766,691 B2 * | 7/2004 | Venturelli | B29C 35/0805 |
| | | | 73/570.5 |
| 9,908,288 B2 * | 3/2018 | Harkness | B29C 64/112 |
| 2015/0273632 A1 * | 10/2015 | Chen | B22F 12/45 |
| | | | 219/76.1 |
| 2015/0283614 A1 * | 10/2015 | Wu | B22F 3/12 |
| | | | 419/68 |
| 2016/0067922 A1 * | 3/2016 | Voris | B29C 64/393 |
| | | | 425/150 |
| 2018/0015672 A1 | 1/2018 | Shusteff et al. | |
| 2018/0250890 A1 * | 9/2018 | Claussen | B29C 64/386 |
| 2019/0016052 A1 * | 1/2019 | Clark | B33Y 10/00 |
| 2019/0217387 A1 * | 7/2019 | Pan | B29C 64/205 |
| 2020/0001533 A1 * | 1/2020 | Packirisamy | B28B 1/001 |
| 2020/0087754 A1 * | 3/2020 | Hibino | C22C 19/056 |

FOREIGN PATENT DOCUMENTS

| | | |
|---|---|---|
| FR | 3030323 A1 | 6/2016 |
| WO | 2018145194 A1 | 8/2018 |

OTHER PUBLICATIONS

EPO. "English Translation of Written Opinion of the International Searching Authority for PCT/EP2020/059578". WIPO. Patentscope. 2023 (Year: 2023).*
International Search Report for issued in Application No. PCT/EP2020/059578 dated Jul. 1, 2020.
Kelly, Brett E. et al.: "Volumetric additive manufacturing via tomographic reconstruction", Science, Jan. 31, 2019, ISSN: 0036-8075, XP055550929.
Office Action Issued in Chinese Application No. 202080029295.9 dated Feb. 8, 2024.

* cited by examiner

PROCESS FOR MANUFACTURING A PART BY LOCAL IRRADIATION OF A MATERIAL BY AT LEAST TWO CONVERGING BEAMS

This is the National Stage of PCT international application PCT/EP2020/059578, filed on Apr. 3, 2020 entitled "PROCESS FOR MANUFACTURING A PART BY LOCAL IRRADIATION OF A MATERIAL BY AT LEAST TWO CONVERGING BEAMS", which claims the priority of French Patent Application No. 1904035 filed Apr. 16, 2019, both of which are incorporated herein by reference in their entirety.

TECHNICAL FIELD

The present invention relates to the field of manufacturing parts by selective melting or selective sintering of a material in the form of powder or by photopolymerising a resin-type material in the form of powder or with a paste-like consistency. In particular, the invention can be applied to the manufacture of metal, ceramic or polymeric parts.

PRIOR ART

The techniques for manufacturing parts by selective melting or selective sintering of a powder make it possible to easily produce plastic, metal or ceramic parts with a complex geometry.

These techniques generally consist of selective melting or selective sintering processes on a bed of powder as described in document [1], which typically comprises a step in which a first layer of powder of a metal, a metal alloy, a ceramic or a polymer of controlled thickness is deposited on a manufacturing plate, then a step consisting of heating with heating means (for example a laser or an electron beam) a predefined zone of the powder layer, and these steps are repeated for each additional layer until the final part is obtained, slice by slice.

However, there are disadvantages to these manufacturing processes on a bed of powder.

Firstly, it takes a long time to build since the part is built up layer by layer.

In addition, there are other disadvantages relating to the type of additive manufacturing used. For example, in the case of SLM (Selective Laser Melting) additive manufacturing, it is sometimes necessary to provide means for supporting the powder in order to prevent it from collapsing during manufacture; in the case of EBM (Electron Beam Melting) additive manufacturing, it is necessary to manage the removal of powder from internal spaces of the part, such as internal channels for example.

The manufacturing time and the possible geometries of parts are therefore dependent on depositing the powder layer by layer and by the process used for melting or sintering the powder and the support means provided for the powder.

The same problems exist in the case of stereolithography by photopolymerisation, where material is also deposited layer by later, the material being in the form of a powder or having a paste-like consistency.

There is thus a need to optimise the manufacture of parts, whether they are obtained by selective melting or selective sintering of a powder or by photopolymerisation of a material in the form of powder or having a paste-like consistency.

DESCRIPTION OF THE INVENTION

To address this need at least partially, the objective of the invention is firstly a process for manufacturing a part by the local irradiation of a material capable of being sintered, melted or photopolymerised, said process comprising the steps of:

a) providing a volume of material, from which the whole part is to be manufactured and compressing said volume of material by applying pressure on said volume of material;

b) defining in the volume of material a plurality of distinct target volumes, the combined target volumes defining the part to be manufactured;

c) for each target volume, maintaining the pressure applied to the volume of material in step a) and simultaneously irradiating the target volume with at least two beams which are converging in the target volume and which are continuous, thereby obtaining the piece;

wherein the material is partially transparent to said at least two beams;

wherein the energy deposited in the target volume by each beam is less than a threshold energy, and the sum of energies introduced into the target volume by each of the beams is greater than or equal to a transformation threshold energy; and wherein:

when the material is sinterable and optionally meltable, the threshold energy is lower than a sintering energy of the material and the transformation threshold energy corresponds to the sintering energy of the material, when selective sintering is desired in the irradiated target volume, or to the melting energy of the material, when selective melting is desired in the irradiated target volume;

when the material is photopolymerisable, the threshold energy is lower than a photopolymerisation energy of the material and the transformation threshold energy corresponds to the photopolymerisation energy of the material, when photopolymerisation in the irradiated target volume is desired;

d) releasing the part from the rest of the non-irradiated material.

Contrary to the prior art, in which the material is deposited layer by layer in powder form or in a paste-like consistency for manufacturing the part slice by slice, the volume of material from which the part is made and which is supplied in step a) is deposited in one go and then melted, sintered or locally photopolymerised in different target volumes within this volume of material.

According to a first variant, step b) defining a plurality of target volumes, the target volumes are irradiated simultaneously in step c).

According to a second variant, step b) defining a plurality of target volumes, the target volumes are irradiated in succession in step c).

In the context of the present invention, the term "beam" is defined as an energetic beam of electromagnetic radiation, such as for example a laser beam, or a particle beam, such as for example an electron beam.

Preferably, the at least two beams are focused in the target volume. In this way it is ensured that the material is melted or sintered or photopolymerised locally in the desired location. Advantageously, the at least two beams are converging in their focal point. This makes it possible to have melting, sintering or photopolymerisation in the precise location desired and with no risk of melting, sintering or photopolymerisation outside the converging focal point of the beams.

According to a preferred embodiment of the invention, the at least two beams have the same surface energy. This makes it possible to have equivalent and coherent beam sources. This also makes it possible to prevent the input of energy from one of the two beams leading to melting, sintering or photopolymerisation, without the energy input of the second beam.

According to another preferred embodiment of the invention, the at least two beams are three in number. This makes it possible to ensure maximum precision on the location of the melting, sintering or polymerisation zone, in the same way as triangulation is used for GPS type services.

The compression may be for example isostatic compression, i.e. compression (with a given pressure which does not vary and which is identical in all directions) of the volume of material.

According to a first variant, the volume of powder provided in step a) is in the form of powder. The material in the form of powder can be sinterable, meltable or photopolymerisable. For example, the photopolymerisable material may be a resin in powder form.

Preferably, in step a), the powder volume material is in the form of a stacked assembly of particles, which is divided fictitiously into an inner volume and a peripheral volume which surrounds the inner volume, and in step b), at least one target volume of the plurality of target volumes is defined in the inner volume. The thickness of the peripheral volume may correspond for example to the thickness of a layer of powder deposited in additive manufacturing by depositing powder layer by layer.

Preferably, the powder has an average granulometry of between 5 and 65 µm. It should be noted that in the present description the term "between . . . and . . . " should be understood to include the limit values.

According to a second variant, the volume of powder provided in step a) is a resin with a paste-like consistency, which is photopolymerisable. In the context of the present invention, a resin is considered to have a paste-like consistency when it has a viscosity between 150 and 500 Pa·s at 30° C. (the viscosity being measured for example by means of a Brookfield type viscometer).

Preferably, the at least two beams are energetic beams of the same type and are selected from laser beams, microwave beams, UV beams and IR beams. In the case of a photopolymerisable material (in powder form or with a paste-like consistency), UV beams are selected.

BRIEF DESCRIPTION OF THE DRAWINGS

The invention will be understood better and other details, features and advantages of the invention will be apparent from reading the following description, given as a non-limiting example, with reference to the attached drawings in which.

DETAILED DESCRIPTION OF PARTICULAR EMBODIMENTS

Figure 1A:
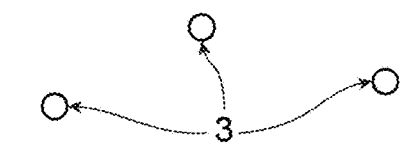
FIGS. 1a-1c illustrate the steps of the manufacturing process according to the invention.
Figure 1A:
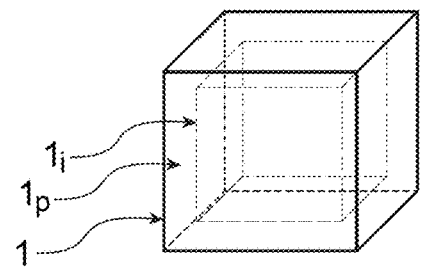

According to the invention, at least two beams are used, preferably three beams for simultaneously irradiating and thus locally heating a portion of a volume of material, this portion being referred to as the "target volume". The beams are arranged converging into the target volume and are continuous. Each target volume of material is intended to form, once in the sintered, melted or photopolymerised state, a portion of the part to be made. By simultaneously or successively heating a plurality of target volumes of material, the part can therefore be produced in the same volume of material, without having to deposit the material layer by layer, as in the prior art. By avoiding this layer-by-layer deposit of material, the process according to the invention therefore saves time during the manufacture of a part. It also enables the manufacture of parts of any shape, the complexity of the part being limited only by the possibility or not of removing non-irradiated material blocked in the internal channels.

The material can be in powder form and the powder material may be metal, ceramic or polymeric. The metal powder may be a metal or an alloy. The powder may be in the form of photopolymerisable resin. The material can also be in the form of a resin with a paste-like consistency that is photopolymerisable.

The choice of type of beam to be used is made according to the energy which needs to be introduced into the target volume so that the material melts, sinters or photopolymerises. However, this depends on the material, but also on the result that one wishes to achieve, namely sintering, melting or photopolymerisation. If the material is in the form of powder and a sintering of particles is desired, the sum of the energies introduced by each of the beams into the target volume, when they simultaneously irradiate this target volume while converging, has to be greater than or equal to a threshold energy necessary for sintering. If the material is in powder form and the melting of particles is desired, the sum of these energies in the target volume has to be greater than or equal to a threshold energy necessary for melting.

It is also necessary that the material is partially transparent to the selected beams so that the beams can reach the desired target volume within the volume of material. A material is considered to be partially transparent to a beam if it absorbs up to 60% of the beam (the value 0% being excluded).

Preferably, energetic beams of the same type are selected.

For example, it is possible to use microwave beams for melting a metal powder of a nickel-based alloy (for example Inconel™ 718) or a titanium alloy (for example TA6V), so as to obtain a total power between 200 and 400 W and/or a linear energy between 0.01 J/mm and 1 J/mm. For example, to obtain a power of 200 W, two beams of 100 W can be used. In this way compressor blades can be produced for example.

For melting a thermosetting polymer powder, for example an epoxy resin powder, which is used for the production of acoustic panels or engine trim parts (for example damping elements), UV beams with a power between 60 and 100 W can be used and/or a surface energy between 0.001 and 0.05 $J/mm^2$, or laser beams having a power between 20 and 40 W and/or surface energy between 0.005 and 0.025 $J/mm^2$.

It is preferable to have as little space as possible between the particles of powder used, so as to avoid any problem of deformations in the interior of the part (collapse due to lack of material) or any problem of lack of material (porosities dues to the fact that there is too much space between the grains of powder before the melting and therefore a shrinking of material after melting). For this reason, it is preferable to use a powder having a granulometry between 5 µm and 65 µm. The powder can be screened to obtain the desired granulometry.

It is also preferable that the powder is compacted before starting the local heating of the powder (by simultaneous irradiation with at least two beams of a target volume), in order to prevent the part being formed from collapsing into the powder, due to a higher density and shrinkage during melting which may be between 1% and 10%. The same applies when the material is in the form of a resin with a paste-like consistency.

For this purpose, the compression in step a) may be a step of compressing the material (in the form of powder or with a paste-like consistency). For example the material can be poured into a pressing die and uniaxial pressing may be performed by applying pressure to the upper surface of the volume of material. In one variant, it is also possible to apply multiaxial pressing (for example, six plates around a cubic volume, with equal pressure on each of the six plates). This produces a compact powder or material with a paste-like consistency.

Preferably, a constant mechanical pressure is applied to the volume of material during step c) irradiating the target volumes leading to local heating or photopolymerisation of the volume of material. For example it is possible to pour the volume of material into a container with movable walls capable of being displaced in order to apply pressure to the volume of material throughout the manufacturing process. Of course, the movable walls are at least partially transparent to the beams.

Figure 1B:
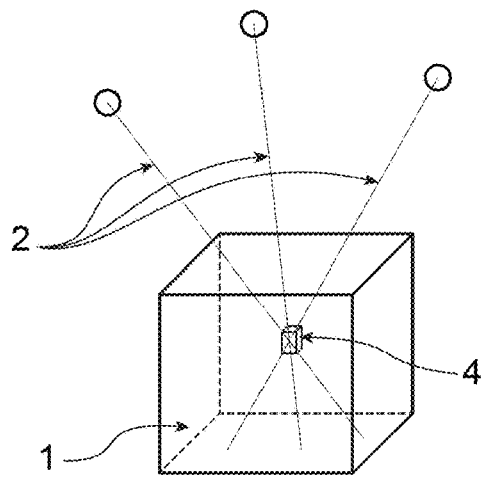
Figure 1C:
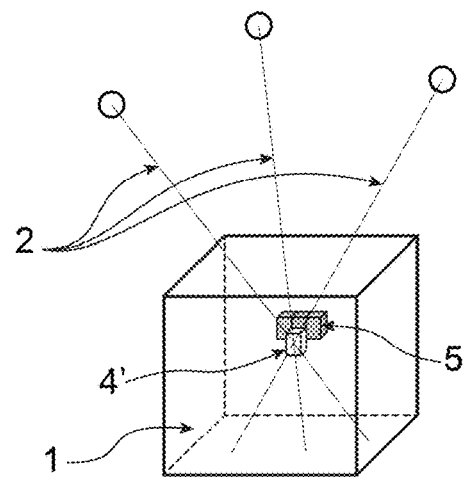

According to a preferred embodiment of the invention illustrated in FIGS. 1a to 1c, three beams of the same type are used for locally melting, sintering or photopolymerising a previously screened and compacted powder. The material could also be a resin with a paste-like consistency, which has possibly been previously compacted. By using three beams, there is an ideal precision on the area where one wishes to melt, sinter or photopolymerise the powder, since as in the case of a satellite triangulation, a precise point in space can be described from the three straight lines. In FIG. 1a, the screened and compacted powder 1 is represented in the form of a cube, and the origins of the three beams 2 are represented by three circles 3. In FIG. 1a, the inner volume of powder $1_i$ is also represented which is surrounded by a peripheral volume of powder $1_p$. In FIG. 1b, the three beams are directed simultaneously towards a target volume 4 so that they are converging in this target volume 4. The target volume 4 is represented here as being inside the screened and compacted cube of powder, i.e. inside the inner volume $1_i$. The powder contained in the target volume 4, once melted (or sintered or photopolymerised), and cooled, gives a volume of melted (or sintered or photopolymerised) powder 5 (FIG. 1c); then another target volume 4' is selected, the beams are directed into this target volume 4' and so on until the complete part is obtained.

In summary, the three beams are directed simultaneously towards the powder so as to be converging and concentred on the same point, and more precisely on the same target volume of the powder. If three sources are available, they are of course placed at sufficient distances from one another to ensure that the desired area is processed with precision. These three beams are then moved to be concentrated on a different target volume of the powder and so on until the part is complete. Preferably, the target volumes treated are adjacent.

According to a preferred variant of the invention, each of the three beams is configured so that the energy introduced into the target volume is equal to ⅓ of the energy necessary for melting the particles of the corresponding target volume. Thus, the melting of the particles only takes place in case of the simultaneous concentration of the three beams in the target volume, thus avoiding any undesired melting (or sintering) in case of a bad placement of the beams. Thus the melting can be performed in the volume of powder in the specific zone desired without requiring the deposit of new layer for melting another slice of the part to be made, as the beams used are selected according to the powder, so that the powder is partially transparent to the beams (and can therefore reach a target volume within the volume of powder (in the inner volume $1_i$)), on the one hand, and without the risk of melting the powder outside the target volume (for example deeper into the volume of powder), because the melting only takes place in the target volume where the beams are simultaneously converging.

The explanations given above are also valid in the case of a resin type material with a paste-like consistency.

For example, the process according to the invention has been used to produce a part from a polymer resin compact (obtained by compressing a 50 litre volume of a thermosetting polymer resin in paste-like form or in powder form by exerting on this volume a pressure of 15 MPa for a period of 30 minutes) by directing onto this compact three UV beams each having a power of 30 W (or a total power of 90 W) and a beam diameter of 100 μm at the convergence point at a speed of 2 mm/s.

The process according to the invention has also been used to make a part from a compact of Inconel™ 718 powder, obtained by compressing a volume of 100 litres of Inconel™ 718 powder having particles with a granulometry of less than 65 μm by exerting a pressure of 15 MPa for a period of 2 h, by directing onto this compact a power of 300 W, with the aid of three microwave beams each having a power of 100 W and a beam diameter of 100 μm at the point of convergence at a speed of 1000 mm/s.

REFERENCE

[1] FR 3 030 323 A1

What is claimed is:

1. A process for manufacturing a part by local irradiation of a material suitable for sintering, melting, or photopolymerising, the process comprising the steps of:
   a) providing a volume of the material, the part being intended to be manufactured completely from the volume of the material, and compressing the volume of the material by applying pressure on the volume of the material to apply isostatic compression to the volume of the material, wherein the material is compacted before starting the local irradiation of the material in order to prevent the part being formed from collapsing;
   b) defining in the volume of the material provided in step a) a plurality of target volumes distinct from each other;
   c) for each target volume, maintaining the pressure applied to the volume of the material in step a) and simultaneously irradiating the target volume with at least two beams which are converging in the target volume and which are continuous, wherein:
   a constant mechanical pressure is applied to the volume of the material during step c);
   the material is partially transparent to the at least two beams;
   an energy introduced into the target volume by each beam is less than a threshold energy, and a sum of energies introduced into the target volume by the at least two beams is greater than or equal to a transformation threshold energy;
   when the material is sinterable and selective sintering is desired in the target volume, the threshold energy is lower than a sintering energy of the material and the transformation threshold energy corresponds to the sintering energy of the material;
   when the material is meltable and selective melting is desired in the target volume, the threshold energy is lower than a melting energy of the material and the transformation threshold energy corresponds to the melting energy of the material;

when the material is photopolymerisable and photopolymerisation in the target volume is desired, the threshold energy is lower than a photopolymerisation energy of the material and the transformation threshold energy corresponds to the photopolymerisation energy of the material; and a combination of the plurality of target volumes irradiated in step c) thereby forms the part; and d) releasing the part from a remaining portion of the material.

2. The process according to claim 1, wherein the target volumes are irradiated simultaneously in step c).

3. The process according to claim 1, wherein the target volumes are irradiated in succession in step c).

4. The process according to claim 1, wherein the at least two beams are focused in the target volume.

5. The process according to claim 4, wherein the at least two beams converge in a focal point.

6. The process according to claim 1, wherein the at least two beams have a same surface energy.

7. The process according to claim 1, wherein the at least two beams are three in number.

8. The process according to claim 1, wherein the volume of the material provided in step a) comprises a powder.

9. The process according to claim 8, wherein the powder has an average granulometry between 5 and 65 µm.

10. The process according to claim 1, wherein the volume of the material provided in step a) is a photopolymerisable resin.

11. The process according to claim 1, wherein the at least two beams are energy beams of a same type and are selected from laser beams, microwave beams, UV beams, and IR beams.

12. A process for manufacturing a part by local irradiation of a material suitable for sintering, melting, or photopolymerising, the process comprising the steps of:

a) providing a volume of the material, the part being intended to be manufactured completely from the volume of the material, and compressing the volume of the material by applying pressure on the volume of the material to apply isostatic compression to the volume of the material, wherein the material is compacted before starting the local irradiation of the material in order to prevent the part being formed from collapsing;

b) defining a target volume in the volume of the material provided in step a); and c) maintaining the pressure applied to the volume of the material in step a) and simultaneously irradiating the target volume with at least two beams which are converging in the target volume and which are continuous, wherein:

a constant mechanical pressure is applied to the volume of the material during step c);

the material is partially transparent to the at least two beams;

an energy introduced into the target volume by each beam is less than a threshold energy, and a sum of energies introduced into the target volume by the at least two beams is greater than or equal to a transformation threshold energy;

when the material is sinterable and selective sintering is desired in the target volume, the threshold energy is lower than a sintering energy of the material and the transformation threshold energy corresponds to the sintering energy of the material;

when the material is meltable and selective melting is desired in the target volume, the threshold energy is lower than a melting energy of the material and the transformation threshold energy corresponds to the melting energy of the material;

when the material is photopolymerisable and photopolymerisation in the target volume is desired, the threshold energy is lower than a photopolymerisation energy of the material and the transformation threshold energy corresponds to the photopolymerisation energy of the material; and the target volume irradiated in step c) thereby forms a portion of the part.

* * * * *